United States Patent
Kim et al.

(10) Patent No.: US 11,773,221 B2
(45) Date of Patent: Oct. 3, 2023

(54) POLYIMIDE FILM AND FLEXIBLE DISPLAY PANEL INCLUDING THE SAME

(71) Applicants: SK Innovation Co., Ltd., Seoul (KR); SK IE Technology Co., Ltd., Seoul (KR)

(72) Inventors: Hyeon Jeong Kim, Daejeon (KR); Sang Yoon Park, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 142 days.

(21) Appl. No.: 17/246,858

(22) Filed: May 3, 2021

(65) Prior Publication Data

US 2021/0340326 A1  Nov. 4, 2021

(30) Foreign Application Priority Data

May 4, 2020  (KR) ........................ 10-2020-0053195

(51) Int. Cl.
*C08G 73/10* (2006.01)

(52) U.S. Cl.
CPC .............................. *C08G 73/1078* (2013.01)

(58) Field of Classification Search
CPC ................................................. C08G 73/1078
USPC ....................................................... 428/220
See application file for complete search history.

(56) References Cited

U.S. PATENT DOCUMENTS 5,969,080 A    10/1999  Ieki et al.
8,754,186 B2    6/2014  Fujihara et al.
10,738,173 B2   8/2020  Chae et al.
2017/0342224 A1* 11/2017 Chae ........................ G09F 9/301
2019/0077960 A1  3/2019  Kim et al.

FOREIGN PATENT DOCUMENTS

| JP | 2006160974 A | 6/2006 |  |
|---|---|---|---|
| JP | 2014201632 A | 10/2014 |  |
| JP | 2017186466 A | 10/2017 |  |
| KR | 19990029095 A | 4/1999 |  |
| KR | 1020090013921 A | 2/2009 |  |
| KR | 1020090094828 A | 9/2009 |  |
| KR | 1020170028083 A | 3/2017 |  |
| KR | 1020170132499 A | 12/2017 |  |
| KR | 1020180001175 A | 1/2018 |  |
| KR | 2018018307 A * | 2/2018 | ............ C08G 73/10 |
| KR | 1020180018307 A | 2/2018 |  |
| KR | 1020190029110 A | 3/2019 |  |
| KR | 1020190090300 A | 8/2019 |  |

OTHER PUBLICATIONS

Machine_English_translation_KR_2018018307_A; Jang, T.; et al.; Polyamic Acid Resin and Polyamideimide Film ; Feb. 21, 2018; EPO; whole document (Year: 2022).*

* cited by examiner

*Primary Examiner* — Tahseen Khan
(74) *Attorney, Agent, or Firm* — THE WEBB LAW FIRM

(57) ABSTRACT

The present invention relates to a polyimide-based film, a window cover film, and a display panel including the same. More specifically, the present invention relates to a polyimide-based film having a difference ($\Delta I$) between the maximum and minimum values of intensity in a thickness direction of 0.6 or less, when an aromatic ring peak of 1610 to 1630 $cm^{-1}$ was measured by Raman spectroscopy in which an excitation wavelength is 532 nm, a laser spot is 1 to 2 μm, and a thickness direction measurement interval is 1 μm.

13 Claims, No Drawings

POLYIMIDE FILM AND FLEXIBLE DISPLAY PANEL INCLUDING THE SAME

CROSS-REFERENCE TO RELATED APPLICATION

This application claims priority to Korean Patent Application No. 10-2020-0053195 filed May 4, 2020, the disclosure of which is hereby incorporated by reference in its entirety.

BACKGROUND OF THE INVENTION

Field of the Invention

The following disclosure relates to a polyimide-based film, a window cover film, and a display panel including the same.

Description of Related Art

A thin display device such as a liquid crystal display or an organic light emitting diode display has been implemented in a form of a touch screen panel, and has been widely used in various smart devices having portability, such as various wearable devices as well as smartphones and tablet personal computers (PCs).

These portable touch screen panel-based display devices include a window cover for display protection on a display panel in order to protect the display panel from scratches or external impact. Recently, in accordance with the development of a foldable display device having flexibility so as to be foldable and unfoldable, a glass material of such a window cover has been replaced with a plastic film.

In order to be used as a base material for such a window cover film, the material is required to have transparency like a glass while having excellent mechanical properties. Recently, there is a need for a window cover film whose occurrence of curl, etc., caused by asymmetry of both surfaces even under high temperature and high humidity conditions may be minimized.

When a polyimide film is manufactured, a polyamic acid as a precursor is usually prepared and subjected to imidization. In this case, heating of the polyamic acid at a high temperature is required in order to sufficiently imidize the polyamic acid. However, during such heating of the polyamic acid at the high temperature, a difference is generated in heat history between a surface layer and an inside of the film, such that a difference is generated in an imidization rate or an orientation of molecules between the surface layer and the inside.

Accordingly, a difference is generated in physical properties such as strength between the surface layer and the inside of the manufactured polyimide film, and such a difference in the physical properties also cause distortion such as curl or bending when the polyimide film is applied to a window cover film.

RELATED ART DOCUMENT

Patent Document (Patent Document 1) Korean Patent Laid-Open Publication No. 10-2017-0028083 (published on Mar. 13, 2017).

SUMMARY OF THE INVENTION

An embodiment of the present invention is directed to providing a polyimide-based film for a window cover that has excellent dimensional stability over the entire area of the film and may prevent distortion such as curl or bending.

Another embodiment of the present invention is directed to providing a flexible display panel having improved durability and mechanical properties.

In one general aspect, there is provided a polyimide-based film having a difference($\Delta I$) between the maximum and minimum values of intensity in a thickness direction of 0.6 or less, preferably 0.4 or less, and more preferably 0.3 or less, when an aromatic ring peak of 1610 to 1630 $cm^{-1}$ was measured by Raman spectroscopy in which an excitation wavelength is 532 nm, a laser spot is 1 to 2 μm, and a thickness direction measurement interval is 1 μm.

The polyimide-based film may have a degree of curl of 5 mm or less, preferably 4 mm or less, and more preferably 3 mm or less.

The polyimide-based film may have a light transmittance of 5% or more at 388 nm and a total light transmittance of 87% or more at 400 to 700 nm as measured according to ASTM D1746, a haze of 2.0% or less, and a yellow index of 5.0 or less, and a b* value of 2.0 or less.

The polyimide-based film may have a modulus of 3 GPa or more and an elongation at break of 8% or more as measured according to ASTM D882.

The polyimide-based film may have a thickness of 10 to 500 μm.

The polyimide-based film may be formed of a polyimide-based resin having a polyamide-imide structure. The polyimide-based resin may contain a unit derived from a fluorine-based aromatic diamine. The polyimide-based resin may contain a unit derived from a cycloaliphatic dianhydride.

The polyimide-based resin may contain a unit derived from a fluorine-based aromatic diamine, a unit derived from an aromatic dianhydride, and a unit derived from an aromatic diacid dichloride. The polyimide-based resin may further contain a unit derived from a cycloaliphatic dianhydride.

In another general aspect, there is provided a window cover film including the polyimide-based film as described above; and a coating layer formed on one surface of the polyimide-based film.

The coating layer may be any one or more selected from the group consisting of an antistatic layer, an anti-fingerprint layer, an anti-fouling layer, an anti-scratch layer, a low refractive layer, an anti-reflection layer, and an impact absorbing layer.

In another general aspect, there is provided a flexible display panel including the polyimide-based film as described above.

DESCRIPTION OF THE INVENTION

Hereinafter, the present invention will be described in more detail through the accompanying Examples. The following specific examples and Examples are only a reference for describing the present invention in detail, and the present invention is not limited thereto, and may be implemented in various forms.

In addition, all technical terms and scientific terms have the same meanings as those commonly understood by a person skilled in the art to which the present invention pertains unless otherwise defined. The terms used in the description of the present invention are only for effectively describing certain embodiments, and are not intended to limit the present invention.

In addition, singular forms used in the detailed description and the claims are intended to include the plural forms unless otherwise indicated in context.

Unless explicitly described to the contrary, "including" any component will be understood to imply the inclusion of other components rather than the exclusion of other components.

In the present invention, "polyimide-based resin" is used as a term including a polyimide resin or a polyamide-imide resin. The same goes for "polyimide-based film."

In the present invention, "polyimide-based resin solution" has the same meaning as a "composition for forming a polyimide-based film" and a "polyamide-imide solution." In addition, the polyimide-based resin and a solvent may be included in order to form a polyimide-based film.

In the present invention, a "film" is obtained by applying and drying the "polyimide-based resin solution" onto a support and then peeling off the resultant from the support, and may have a thickness of 10 to 500 µm, preferably 20 to 250 µm, and more preferably 30 to 150 µm, but is not limited thereto.

In the present invention, "curl" and "curling" may refer to bending-deformation of the film, and a "degree of curl" may refer to a vertical height from the lowest point of the film to a point where the film is bent and raised when a film of which curl is generated is disposed on a plane.

The term "curl suppression property" as used herein may refer to a property in which the "degree of curl" is less.

The inventors of the present invention have completed the present invention by finding that a polyimide-based film of which curl generation is suppressed and a shrinkage rate is small may be provided within a range that satisfies a specific range and physical properties suitable for the polyimide-based film to have a small change rate in transmittance and haze to be used as an optical film such as a window cover film may be provided through observation of a surface and an internal structure of a film by Raman spectroscopy, as a result of performing many studies in order to achieve the above object.

In addition, in the present invention, a polyimide-based film may be manufactured using a polyimide-based resin containing a fluorine atom and an aliphatic cyclic structure. More preferably, a polyimide-based film manufactured using a polyamide imide resin prepared by preparing an amine-terminated polyamide oligomer having a polyamide repeating unit using a specific monomer composition containing a fluorine atom and then allowing the amine-terminated polyamide oligomer to react with a dianhydride may be used. That is, the present inventors have completed the present invention by confirming that the present invention may be achieved through a combination of monomers or adjustment of various preparation processes, and the present invention is not limited as long as physical properties are satisfied. Some of processes of a manufacturing method of a polyimide-based film according to the present invention include a stretching step and a heat-treatment step, and the stretching step and the heat-treatment step are performed in a stretching region and a heat-treatment region, respectively. The stretching region and the heat-treatment region may include two or more repeated regions, respectively. In this case, stretching performed in a rear end stretching region may be performed at a lower temperature than stretching performed at a front end stretching region positioned immediately before the rear end strength region. When stretching is performed in a smaller stretching ratio, a film having no difference in structure between a surface layer and an inside of the film to have a uniform structure, have less curl generation, and have excellent transmittance and transparency, and thus, suitable for being applied as an optical film may be manufactured, and desired physical properties of the present invention may be obtained, but the present invention is not necessarily limited to the above conditions.

Hereinafter, a polyimide-based film according to an embodiment will be described in more detail.

<Polyimide-Based Film>

In an aspect of the present invention, a polyimide-based film may be formed of a material having excellent optical and mechanical properties and having an elastic force and a restoring force.

In an embodiment of the present invention, a polyimide-based film has a difference($\Delta I$) between maximum and minimum values of an intensity in a thickness direction of 0.6 arbitrary unit (AU) or less, when an aromatic ring peak of 1610 to 1630 $cm^{-1}$ was measured by Raman spectroscopy in which an excitation wavelength is 532 nm, a laser spot is 1 to 2 µm, and a thickness direction measurement interval is 1 µm, and within the above range, a surface and an inside of the film for the purpose of the present invention may exhibit uniform physical properties. $\Delta I$ is preferably 0.4 AU or less, and more preferably 0.3 AU or less because the effect of the present invention is better exhibited.

More specifically, the difference($\Delta I$) between the maximum and minimum values may be 0.1 to 0.6, and within this range, a polyimide-based film having a uniform structure in a thickness direction, having less curl generation, and having excellent transmittance and transparency, and thus, applicable as an optical film may be provided.

The Raman spectroscopy may be general Raman spectroscopy, but it is preferable to make a laser spot fine by microscopic Raman spectroscopy, where the laser spot is preferably 1 to 2 µm in size. If the laser spot is excessively large, accurate measurement is difficult, while if the laser spot is excessively small, an error may occur. Therefore, the laser spot is preferably 1 to 2 µm in size. In addition, an excitation wavelength used for Raman spectroscopy is preferably 1064 nm, and a wavelength resolution (sampling interval) is preferably 1 $cm^{-1}$ or more.

In an aspect of the present invention, the polyimide-based film may have a thickness of 10 to 500 µm, 20 to 250 µm, or 30 to 110 µm.

In an aspect of the present invention, the polyimide-based film may have a light transmittance of 5% or more, or 5 to 80% at 388 nm and a total light transmittance of 87% or more, 88% or more, or 89% or more at 400 to 700 nm as measured according to ASTM D1746, a haze of 2.0% or less, 1.5% or less, or 1.0% or less as measured according to ASTM D1003, and a yellow index of 5.0 or less, 3.0 or less, or 0.4 to 3.0 and a b* value of 2.0 or less, 1.3 or less, or 0.4 to 1.3 as measured according to ASTM E313. In the above-described range, optical properties suitable for applying the polyimide-based film as the window cover film may be provided.

In an embodiment of the present invention, the polyimide-based film may have a modulus of 3 GPa or more, 4 GPa, or 5 GPa or more, and an elongation at break of 8% or more, 12% or more, or 15% or more as measured according to ASTM D882. The above-described range may provide mechanical properties suitable for application as the window cover film.

In an aspect of the present invention, the polyimide-based film is formed of a polyimide-based resin, specifically, a polyimide-based resin having a polyamide-imide structure.

In addition, the polyimide-based resin may be more preferably, a polyamide-imide-based resin containing a fluorine atom and an aliphatic cyclic structure. The polyimide-based film may have excellent appearance quality, mechanical properties, and dynamic bending properties while a difference($\Delta I$) between maximum and minimum values of an intensity in a thickness direction is in the range of 0.6 or less for the purpose of the present invention, when an aromatic ring peak of 1610 to 1630 cm$^{-1}$ was measured by Raman spectroscopy by combining various conditions such as monomer change, stretching, or heat setting with each other.

In an embodiment of the present invention, an example of the polyamide-imide resin containing a fluorine atom and an alicyclic structure includes a polyamide-imide polymer prepared by preparing an amine-terminated polyamide oligomer derived from a first fluorine-based aromatic diamine and an aromatic diacid dichloride, and then polymerizing the amine-terminated polyamide oligomer with a monomer derived from a second fluorine-based aromatic diamine, an aromatic dianhydride, and a cycloaliphatic dianhydride, which is preferable because an object of the present invention is better achieved. The first fluorine-based aromatic diamine and the second fluorine-based aromatic diamine may be in the same or different types.

In an aspect of the present invention, when polyimide-based film contains the amine-terminated oligomer in which an amide structure is formed in a polymer chain by aromatic diacid dichloride as a monomer of a diamine, optical properties of the polyimide-based film may be improved, mechanical strength of the polyimide-based film including particularly a fine flexural modulus may be improved, and dynamic bending properties of the polyimide-based film may be further improved. Therefore, the polyimide-based film may be appropriately used as a window cover film of a flexible display subjected to a repeated folding and unfolding operation.

In an aspect of the present invention, when having a polyamide oligomer block as described above, a molar ratio between the diamine monomer including an amine-terminated polyamide oligomer and the second fluorine-based aromatic diamine, and the dianhydride monomer including the aromatic dianhydride and the cycloaliphatic dianhydride, may be preferably 1:0.9 to 1:1.1, preferably 1:1. In addition, a content of the amine-terminated polyamide oligomer with respect to the entire diamine monomer is not particularly limited. However, it is more preferable to include 30 mol % or more, preferably 50 mol % or more, and more preferably 70 mol % or more for satisfying a mechanical property, a yellow index, and an optical property of the present invention. In addition, a composition ratio between the aromatic dianhydride and the cycloaliphatic dianhydride is not particularly limited. However, when considering the achievement of transparency, a yellow index, mechanical properties, etc. of the present invention, it is preferable to use in a ratio of 30 to 80 mol %: 70 to 20 mol %, but is not necessarily limited thereto.

In an aspect of the present invention, the polyamideimide-based resin may include a unit derived from a fluorine-based aromatic diamine, and may thus have excellent mechanical properties and optical properties.

In an aspect of the present invention, the polyamide-imide-based resin may include a unit derived from a cycloaliphatic dianhydride, and may thus have excellent optical properties.

In an aspect of the present invention, the polyamideimide-based resin may include a unit derived from fluorine-based aromatic diamine, a unit derived from an aromatic dianhydride, and a unit derived from an aromatic diacid dichloride, and may thus have excellent mechanical properties.

In an aspect of the present invention, it is more preferable because the polyamide-imide-based resin uses a quaternary copolymer containing all of a unit derived from a fluorine-based aromatic diamine, a unit derived from an aromatic dianhydride, a unit derived from a cycloaliphatic dianhydride, and a unit derived from an aromatic diacid dichloride, such that optical properties such as transparency and mechanical properties may be satisfied, generation of bending under high temperature and high humidity conditions may be prevented, a haze change is small, and heat shrinkage is small, and in particular, a film having more uniform physical properties in a thickness direction of the film after being stretched during the manufacture of the film according to the manufacturing method of the present invention may be provided.

In addition, another example of the polyamide-imide resin containing a fluorine atom and an alicyclic structure in the present invention may include a polyamide-imide resin obtained by mixing, polymerization and imidization of a fluorine-based aromatic diamine, an aromatic dianhydride, a cycloaliphatic dianhydride, and an aromatic diacid dichloride. Such a resin has a random copolymer structure, may have 40 moles or more, preferably 50 to 80 mol of aromatic diacid dichloride, 10 to 50 mol of aromatic dianhydride, and 10 to 60 mol of cycloaliphatic dianhydride, with respect to 100 moles of the diamine, and may be prepared by polymerizing diacid dichloride and dianhydride in a molar ratio of 1:0.8 to 1:1.1 with respect to the diamine monomer. Preferably it may be polymerized in a molar ratio of 1:1.

The random polyamide-imide of the present invention may also fall within the scope of the present invention, although there is a slight difference in optical properties such as a transparency, and mechanical properties, compared to the block-type polyamide-imide resin.

In an aspect of the present invention, as the fluorine-based aromatic diamine component, a combination of 2.2'-bis(trifluoromethyl)-benzidine and other known aromatic diamine components may be used, but 2.2'-bis(trifluoromethyl)-benzidine may be used alone. An excellent optical property and a yellow index may be improved based on the mechanical properties of the polyamide-imide film required in the present invention by using such a fluorine-based aromatic diamine. In addition, a mechanical strength of a hard coating film may be improved and dynamic bending properties of the hard coating film may be further improved by improving a fine flexural modulus of the polyamide-imide-based film.

The aromatic dianhydride may be at least one or a mixture of two or more selected from the group consisting of 4,4'-hexafluoroisopropylidene diphthalic anhydride (6FDA) and biphenyltetracarboxylic dianhydride (BPDA), 4,4-oxydiphthalic dianhydride (ODPA), sulfonyl diphthalic anhydride (SO2DPA), (isopropylidenediphenoxy) bis(phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxyphenyl) dimethyl silane dianhydride (SiDA), and bis(dicarboxyphenoxy) diphenyl sulfide dianhydride (BDSDA), but the present invention is not limited thereto.

The cycloaliphatic dianhydride may be, for example, any one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof.

In an aspect of the present invention, when an amide structure in a polymer chain is formed by the aromatic diacid dichloride, not only optical properties may be improved, but a mechanical strength may also be significantly improved, and a dynamic bending property may also be further improved.

The aromatic diacid dichloride may be, but is not limited to, a mixture of two or more selected from the group consisting of isophthaloyl dichloride (IPC), terephthaloyl dichloride (TPC), 1,1'-biphenyl-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof.

Hereinafter, a method of manufacturing the polyimide-based film will be illustrated.

In an aspect of the present invention, the polyimide-based film may be manufactured by applying a "polyimide-based resin solution" containing the polyimide-based resin and a solvent onto a base, and then drying, or drying and stretching the polyimide-based resin solution. That is, the polyimide-based film may be manufactured by a solution casting method.

In the present invention, the desired physical properties of the present invention may be obtained through the manufacture of a film by various combinations of the above monomers, or by controlling a casting method using the produced polymer, stretching, and heat treatment, etc. Also, the desired physical properties of the present invention may be obtained by adding an additive such as silica to the polymer, and therefore the method of obtaining the properties is not limited.

Thus, in the present invention, if a difference between maximum and minimum values of an intensity in a thickness direction, ΔI (degree of orientation), is 0.6 or less and the degree of curl is 5 mm or less, when an aromatic ring peak of 1610 to 1630 cm$^{-1}$ was measured by Raman spectroscopy described below, there is no need to limit the means.

More preferably, ΔI (degree of orientation) of 0.4 or less and the degree of curl described below of 4 mm or less, more preferably 3 mm or less are more preferred.

A polyimide-based film for a window cover that has excellent dimensional stability over the entire area of the film and may prevent distortion such as curl or bending may be provided, through the above-mentioned control of the present invention.

Accordingly, there is also provided a flexible display panel having improved durability and mechanical properties.

Hereinafter, a method for preparing a polyimide of the present invention will be described using a polymer with the following monomers, without limitation.

The polyamide-imde film may be manufactured by a method including: preparing an oligomer by reacting a fluorine-based aromatic diamine with an aromatic diacid dichloride, preparing a polyamic acid solution by reacting the prepared oligomer with a fluorine-based aromatic diamine, an aromatic dianhydride, and a cycloaliphatic dianhydride, preparing a polyamide-imide resin by imidizing the polyamic acid solution, and forming a film by applying a polyamide-imide solution in which the polyamide-imide resin is dissolved in an organic solvent.

The preparing of the oligomer may include: reacting a fluorine-based aromatic diamine with an aromatic diacid dichloride in a reactor, and purifying and drying the obtained oligomer. In this case, the fluorine-based aromatic diamine may be added in a molar ratio of 1.01 to 2, compared to the aromatic diacid dichloride to prepare an amine-terminated polyamide oligomer monomer. A molecular weight of the oligomer monomer is not particularly limited, but for example, when the weight average molecular weight is 1000 to 3000 g/mol, more excellent physical properties may be obtained.

In addition, it is preferable to use an aromatic carbonyl halide monomer such as terephthaloyl chloride or isophthaloyl chloride, not terephthalic acid ester or terephthalic acid itself, in order to introduce the amide structure. It seems that a chlorine element affects the physical properties of the film, but it is not clear.

Next, the preparing of the polyamic acid solution may be performed through a solution polymerization of reacting the prepared oligomer with a fluorinated aromatic diamine, an aromatic dianhydride, and a cycloaliphatic dianhydride in an organic solvent. Here, an organic solvent used for polymerization may be, for example, any one or two or more polar solvents selected from the group consisting of dimethylacetamide (DMAc), N-methyl-2-pyrrolidone (NMP), dimethylformamide (DMF), dimethylsulfoxide (DMSO), ethyl cellosolve, methyl cellosolve, acetone, ethylacetate, and m-cresol.

More specifically, a polyamide-imide film in which an amide intermediate is uniformly distributed may be manufactured by reacting a fluorinated aromatic diamine and an aromatic diacid dichloride to prepare an intermediate in the form of an oligomer including an amide unit, and then reacting the oligomer with a fluorinated aromatic diamine, an aromatic dianhydride, and a cycloaliphatic dianhydride to prepare a polyamic acid solution. As such, the amide intermediate is uniformly distributed throughout the film, such that mechanical properties and optical properties are excellent with respect to the entire area of the film, and coating properties and coating uniformity of the coating composition used in the post-coating process of the hard coating layer, etc. are further improved, and thus, optical properties of a final window cover film are further improved. Therefore, it is possible to provide a film in which an optical mura such as a rainbow and a mura is not generated and of which optical properties are excellent.

Next, the preparing of the polyamide-imide resin by imidizing the polyamic acid solution may be performed through chemical imidization, and it is more preferable that the polyamic acid solution is chemically imidized using pyridine and acetic anhydride. Subsequently, the imidization may be performed at a low temperature of 150° C. or less, preferably 100° C. or less, and specifically 50 to 150° C. using an imidization catalyst and a dehydrating agent.

This method makes it possible to impart uniform mechanical property to the entire film as compared to an imidization reaction by heat at a high temperature.

The imidization catalyst may be any one or two or more selected from the group consisting of pyridine, isoquinoline, and β-quinoline. In addition, the dehydrating agent may be any one or two or more selected from the group consisting of acetic anhydride, phthalic anhydride, and maleic anhydride, but is not necessarily limited thereto.

In addition, the polyamide-imide resin may be prepared by mixing an additive such as flame retardants, adhesion enhancers, inorganic particles, antioxidants, UV inhibitors, and plasticizers in the polyamic acid solution.

Further, after imidization, the resin may be purified using the solvent to obtain a solid content, and the resulting solid may be dissolved in the solvent to obtain a polyamide-imide solution. The solvent may include, but is not limited to, for example, N,N-dimethylacetamide (DMAc), etc.

The forming of the film by applying the polyamide-imide solution, is performed by applying the polyamide-imide solution onto the base and then drying it in a drying step partitioned into a drying zone. In addition, stretching may be performed after or before the drying, if necessary, and a heat treatment step may be further performed after the drying or stretching step. The base may be, but is not limited to, for example, a glass, a stainless steel, or a film, etc. Application may be performed by a die coater, an air knife, a reverse roll, a spray, a blade, a casting, a gravure, a spin coating, etc.

In the present invention, a film that satisfies the physical properties in which the difference (ΔI) between the maximum and minimum values of an intensity in a thickness direction is 0.6 or less may be more easily provided, and a degree of curl of 7 mm or less, preferably 5 mm or less, and more preferably 3 mm or less, is generated, so that a significantly excellent film may be obtained, when the aromatic ring peak of 1610 to 1630 $cm^{-1}$ was measured by Raman spectroscopy for the purpose of the present invention by adopting specific drying conditions and stretching conditions.

In the present invention, drying may be performed in a plurality of drying regions, and when the drying is performed at an excessively high temperature at the early stage, a film of which a surface and an inside are not uniform may be manufactured. Therefore, it is preferable to perform the drying while gradually increasing a temperature toward the rear drying region of the drying region. Specifically, for example, the drying region includes two or more drying regions, and a drying region positioned at a rear end may be set to have a temperature higher than a temperature of a drying region positioned immediately before this drying region. In addition, drying regions positioned at a rear end except for a first drying region may be set to have high temperatures that are the same as or exceed temperatures of drying regions positioned immediately before these drying regions, respectively. A solvent content of the film dried in the drying step may be adjusted to 10 to 30% by weight and proceed to a stretching step.

In addition, when a solvent content of the finally dried film is satisfied, it is preferable that drying times in each region (each step) are the same or approximately the same as each other (here, a phrase "approximately the same" refers to a difference within 10% in a drying time from front end).

The meaning that the drying temperature becomes high toward the rear drying region in the abovementioned drying step is that a second drying region of an initial drying region is set to have a temperature higher than that of a first drying region and a temperature of a drying region behind the second drying region is not lower than that of the second drying region. That is, when drying regions after the second drying region are rear drying regions, the rear drying regions may be set to have temperatures that are the same or approximately the same as each other.

In the present invention, the stretching step may be performed, or the film may be manufactured only by heat treatment without performing the stretching step as long as the physical properties of the present invention are satisfied. Therefore, whether or not the stretching step is not limited as long as the physical properties of the present invention are achieved.

Window Cover Film

In addition, another aspect of the present invention provides a window cover film including the polyimide-based film described above; and a coating layer formed on the polyimide-based film.

When the coating layer is stacked on the polyimide-based film having a change rate in a surface hardness in a specific range, the window cover film in which a visibility is significantly improved may be provided.

In an aspect of the present invention, the window cover film may satisfy all physical properties of a light transmittance of 3% or more at 388 nm and a total light transmittance of 87% or more, 88% or more, or 89% or more at 400 to 700 nm as measured according to ASTM D1746, a haze of 1.5% or less, 1.2% or less, or 1.0% or less as measured according to ASTM D1003, and a yellow index of 4.0 or less, 3.0 or less, or 2.0 and a b* value of 2.0 or less, 1.5 or less, or 1.2 or less as measured according to ASTM E313.

According to an aspect of the present invention, the coating layer is a layer for imparting functionality of the window cover film, and may be variously applied depending on purposes.

As a specific example, the coating layer may include, but is not limited to, any one or more layers selected from the group consisting of a restoration layer, an impact diffusion layer, a self-cleaning layer, an anti-fingerprint layer, an anti-scratch layer, a low refractive index layer, and an impact absorbing layer.

Even though various coating layers are formed on the polyimide-based film as described above, it is possible to provide the window cover film in which a display quality is excellent, optical properties are excellent, and in particular, a rainbow phenomenon is significantly reduced.

In an aspect of the present invention, specifically, the coating layer may be formed on one surface or both surfaces of the polyimide-based film. For example, the coating layer may be disposed on an upper surface of the polyimide-based film or may be disposed on each of upper and lower surfaces of the polyimide-based film. The coating layer may protect the polyimide-based film having excellent optical and mechanical properties from external physical or chemical damage.

In an aspect of the present invention, the coating layer may be formed to have a content of solid of 0.01 to 200 $g/m^2$ with respect to the total area of the polyimide-based film. The coating layer may preferably be formed to have a content of solid of 20 to 200 $g/m^2$ with respect to the total area of the polyimide-based film. The above-described basis weight is provided, such that surprisingly, a rainbow phenomenon does not occur while maintaining functionality, and excellent visibility may thus be implemented.

In an aspect of the present invention, specifically, the coating layer may be formed by applying a composition for forming a coating layer including a coating solvent onto the polyimide-based film. The coating solvent is not particularly limited, and may preferably be a polar solvent. The polar solvent may be, for example, any one or more solvents selected from the group consisting of ether-based solvents, ketone-based solvents, alcohol-based solvents, amide-based solvents, sulfoxide-based solvents, and aromatic hydrocarbon-based solvents. Specifically, the polar solvent may be any one or more solvents selected from the group consisting of dimethylacetamide (DMAc), N-methyl-2-pyrrolidone (NMP), dimethylformamide (DMF), dimethylsulfoxide (DMSO), acetone, ethylacetate, propylene glycol methyl ether, m-cresol, methanol, ethanol, isopropanol, butanol, 2-methoxyethanol, methyl cellosolve, ethyl cellosolve, methyl ethyl ketone, methyl butyl ketone, methyl isobutyl ketone, methyl phenyl ketone, diethyl ketone, dipropyl ketone, cyclohexanone, hexane, heptane, octane, benzene, toluene, and xylene.

In an aspect of the present invention, a method of forming the coating layer by applying the composition for forming a coating layer onto the polyimide-based film may be, but is not limited to, for example, any one or more methods selected from a spin coating method, an immersion method, a spray method, a die coating method, a bar coating method, a roll coater method, a meniscus coating method, a flexo printing method, a screen printing method, a bead coating method, an air knife coating method, a reverse roll coating method, a blade coating method, a casting coating method, and a gravure coating method.

In an aspect of the present invention, the window cover film may further include a base layer. The base layer may be formed on the other surface of the polyimide-based film on which the coating layer is not formed.

In an aspect of the present invention, the polyimide-based film may be manufactured as a film and then stacked on the base layer or may be stacked after applying and coating a polyamic acid resin composition, which is a precursor of the polyimide-based film, but is not particularly limited as long as the above-described stack configuration may be formed.

In an aspect of the present invention, the base layer is not particularly limited as long as it is a base film of a commonly used window cover film, but may include, for example, any one or more selected from the group consisting of an ester-based polymer, a carbonate-based polymer, a styrene-based polymer, and an acrylic-based polymer. Specifically, the base layer may include, but is not limited to, any one or more selected from the group consisting of polyethylene terephthalate, polyethylene naphthalate, polybutylene terephthalate, polybutylene naphthalate, polycarbonate, polystyrene, and polymethyl methacrylate.

In an aspect of the present invention, the base layer may be a single layer or may be a multilayer in which two or more are stacked. Specifically, the base layer may be obtained by stacking an optical adhesive layer on an interface between two or more base films.

In an aspect of the present invention, the base layer may have a thickness of 50 to 300 μm. The base layer may have a thickness of preferably 100 to 300 μm, and more preferably 150 to 250 μm. The base layer may have the thickness as described above to satisfy mechanical properties and significantly reduce a distortion phenomenon of light when the polyimide-based film is stacked.

In an aspect of the present invention, as a specific example, the optical adhesive layer may include, but is not limited to, any one or more selected from the group consisting of an optical clear adhesive (OCA), an optical clear resin (OCR), and a pressure sensitive adhesive (PSA).

In an aspect of the present invention, the window cover film may further include a second optical adhesive layer formed on an interface between the base layer and the polyimide-based film.

Specifically, the second optical adhesive layer formed on the interface between the base layer and the polyimide-based film may be formed of a material that is same as or different from that of the optical adhesive layer in the base layer described above, and may be formed to have a thickness of, for example, 20 to 120 μm. The second optical adhesive layer may be formed to have a thickness of preferably 20 to 80 μm. When the second optical adhesive layer is formed to have a thickness in the above range, the window cover film may implement overall excellent optical properties and a light distortion suppressing effect.

In an aspect of the present invention, the window cover film has a high surface hardness and an excellent flexibility to be lighter and have a more excellent durability against deformation than tempered glass, and is thus excellent as a window substrate on the outermost surface of a flexible display panel.

Another aspect of the present invention provides a display device including a display panel and the window cover film described above formed on the display panel.

In an aspect of the present invention, an application field of the display device is not particularly limited as long as it is a field requiring excellent optical properties, and a display panel appropriate for such a field may be selected and provided. Preferably, the window cover film may be applied to a flexible display device. As a specific example, the window cover film may be applied to, but is not limited to, any one or more image display devices selected from various image display devices such as a liquid crystal display device, an electroluminescent display device, a plasma display device, and a field emission display device.

In the display device including the window cover film of the present invention described above, display quality is excellent, and a distortion phenomenon due to light is significantly reduced, such that, in particular, a rainbow phenomenon in which a rainbow color mura occurs may be significantly suppressed and a user's eye fatigue may be minimized due to excellent visibility.

Hereinafter, the present invention will be described in more detail on the basis of Examples and Comparative Examples. However, the following Examples and Comparative Examples are only examples for describing the present invention in more detail, and the present invention is not limited by the following Examples and Comparative Examples.

Hereinafter, physical properties were measured as follows.

1) Pencil Hardness

A pencil hardness was measured on the basis of a case where a line of 20 mm was drawn at a speed of 50 mm/sec using a load of 750 g, this process was repeated five or more times, and one or more scratches occurred, with respect to a film according to JIS K5400.

2) Modulus/Elongation at Break

A modulus and an elongation at break were measured using UTM 3365 (Instron Corp.) under conditions of pulling a polyamide-imide film having a length of 50 mm and a width of 10 mm at 50 mm/min at 25° C. according to ASTM D882.

A thickness of the film was measured and the measured thickness was input into an instrument. The modulus is represented by GPa and the elongation at break is represented by %.

3) Light Transmittance

A total light transmittance was measured over an entire wavelength region of 400 to 700 nm using a spectrophotometer (Nippon Denshoku, Industries Co., Ltd., COH-400) and a single-wavelength transmittance was measured at 388 nm using an UV/Vis (Shimadzu, UV3600), with respect to a film having a thickness of 50 μm according to ASTM D1746 standard. The light transmittance is represented by %. The light transmittance is represented by %.

4) Haze

A haze was measured using a spectrophotometer (Nippon Denshoku Industries Co., Ltd., COH-400), with respect to a film having a thickness of 50 μm according to ASTM D1003 standard. The haze is represented by %.

5) Yellow Index (YI) and b* Value

A yellow index and a b* value were measured using a colorimeter (Hunter Associates Laboratory, Inc., ColorQuest XE), with respect to a film having a thickness of 50 μm according to ASTM E313 standard.

6) Weight Average Molecular Weight (Mw) and Polydispersity Index (PDI)

A weight average molecular weight and a polydispersity index of the manufactured film were measured using gel permeation chromatography (GPC) (Waters GPC system, Waters 1515 isocratic HPLC Pump, Waters 2414 Refractive Index detector) after dissolving a film sample in a DMAc eluent containing 0.05 M LiBr. At the time of the measurement, a GPC column was connected to Olexis, Polypore and mixed D columns, a DMAc solution was used as the solvent, polymethylmethacrylate (PMMA STD) was used as a standard, and an analysis was performed at a flow rate of 1 mL/min at 35° C.

7) Degree of Orientation

A difference (ΔI) between the maximum and minimum values of an intensity of the polyimide-based film in a thickness direction was measured, when an aromatic ring peak of 1610 to 1630 cm$^{-1}$ was measured by Raman spectroscopy in which an excitation wavelength is 532 nm, a laser spot is 1 μm, and a thickness direction measurement interval is 1 μm.

Analysis was performed as follows.
Device Name: Raman Microscope
Manufacturer: Renishaw (UK)
Model Name: inVia Laser was focused on a film surface (referred to as Air face and A face) and began to enter the film at a depth interval of 1 μm, and intensities of an aromatic ring peak of 1610 to 1630 cm$^{-1}$ for each data point were measured.

At this time, due to a difference in a refractive index on an interface between air and the film, a laser speed when the laser passes through an inside of the film and a laser speed when the laser passes through the air are different from each other, such that different intensities appear. Therefore, when the laser is incident from the film surface (A face) to a bottom surface (B face), points from a start point to a sixth point and points up to a seventh point from the bottom surface (B face) toward the A face were removed and data were obtained.

After removing the points from the film surface (A face) to the sixth point, an intensity of the first point was set to $I_0$, and a relative intensity I of each point measured at intervals of 1 μm in the thickness direction was calculated based on $I_0$.

$I$=intensity of each data point/$I_0$

A maximum value obtained from the relative intensity values thus obtained was $I_{max}$, a minimum value obtained from the relative intensity values was $I_{min}$, and a difference between the maximum value and the minimum value was calculated as follows.

$\Delta I = I_{max} - I_{min}$

8) Measurement of Degree of Curl

The film was cut into a square having a size of 15 cm×15 cm in a direction inclined at 45° with respect to an MD direction. That is, two vertices coincided with the MD direction of the film, and the other two vertices coincided with a TD direction of the film. After leaving the cut film in a constant temperature and humidity condition of 25±3° C., 55±5% for 12 hours, with respect to a plane connecting respective vertices to each other, a maximum value obtained by measuring a vertical height (unit: mm) from the lowest point of the film (e.g., center) to the plane connecting the vertices to each other was taken as a degree of curl (mm).

Example 1

In a reactor, terephthaloyl dichloride (TPC) and 2,2'-bis(trifluoromethyl)-benzidine (TFMB) were added to a mixed solution of dichloromethane and pyridine, and the mixture was stirred at 25° C. for 2 hours under a nitrogen atmosphere. At this time, a molar ratio of TPC:TFMB was set to 300:400, and the solid content was adjusted to be 10% by weight. Thereafter, the reactant was precipitated in an excess of methanol, and then the solid content obtained by filtration was dried under vacuum at 50° C. for 6 hours or more to obtain an oligomer. The prepared oligomer had a formula weight (FW) of 1670 g/mol.

N,N-dimethylacetamide (DMAc), 100 moles of the oligomer, and 28.6 moles of 2,2'-bis(trifluoromethyl)-benzidine (TFMB) were added to the reactor as a solvent and sufficiently stirred. After confirming that the solid raw material was completely dissolved, a fumed silica (surface area 95 m$^2$/g, <1 μm) was added to DMAc in an amount of 1000 ppm relative to the solid, and dispersed and added using ultrasonic waves. 64.1 moles of cyclobutanetetracarboxylic dianhydride (CBDA) and 64.1 moles of 4,4'-hexafluoroisopropylidene diphthalic anhydride (6FDA) were sequentially added and sufficiently stirred, followed by polymerization at 40° C. for 10 hours. At this time, the solid content was 20% by weight. Then, each of pyridine and acetic anhydride was sequentially added to the solution at 2.5 times the moles of the total dianhydride content, and stirred at 60° C. for 12 hours to prepare a polyimide-based resin solution.

The polyimide resin solution was continuously applied onto a stainless belt, and then dried in a drying region designed with four drying regions. Specifically, the drying was performed at 80° C. for 4 minutes in a first drying region, was performed at 110° C. for 2 minutes in a second drying region, was performed at 130° C. for 2 minutes in a third drying region, and was performed at 140° C. for 2 minutes in a fourth drying region. A content of solvent in the film passing through the drying regions was 20% by weight.

Then, the dried film was separated from a support, and the base film was stretched using a pin tenter. The stretching region includes two stretching regions and a heat treatment region, and stretching was performed in a stretching ratio of 102% at 220° C. in a first stretching region, primary heat-treatment was performed at 350° C. for 10 minutes, stretching was performed in a stretching ratio of 101% at 160° C. in a second stretching region, and secondary heat treatment was then performed at 350° C. for 10 minutes. A content of solvent in the final film passing through the stretching and heat-treatment process was adjusted to 2% by weight.

As a result of measuring the physical properties of the manufactured polyamide-imide film, a thickness was 50 μm, a total light transmittance was 89.5%, a haze was 0.32%, a yellow index (YI) was 1.8, a b* value was 1.0, a modulus was 7.2 GPa, an elongation at break was 22.2%, a weight average molecular weight was 310,000 g/mol, a polydispersity index (PDI) was 2.1, and a pencil hardness was HB/750 g. In addition, the degree of orientation and curl generation are shown in Table 1.

Example 2

Example 2 was performed in the same manner as in Example 1, except that stretching was performed at a stretching ratio of 105% at 250° C. in a first stretching region, primary heat-treatment was performed at 350° C. for 10 minutes, stretching was performed at a stretching ratio of 101% at 180° C. in a second stretching region, secondary heat treatment was performed at 350° C. for 10 minutes, in the stretching step of processes according to Example 1.

Physical properties of the manufactured polyamide-imide film were measured and are shown in Table 1 below.

Example 3

In a reactor, 100 mol of 2,2'-bis(trifluoromethyl)-benzidine (TFMB) and 39.6 mol of cyclobutanetetracarboxylic dianhydride (CBDA) were mixed in a N,N-dimethylacetamide solvent and polymerization was carried out at 40° C. for 10 hours. The reactants were mixed with 30 moles of terephthaloyl chloride and 30 moles of isophthaloyl chloride so that the solid content of the total monomer was 10% by weight, and polymerization was carried out at 40° C. for 2 hours.

Then, each of pyridine and acetic anhydride was sequentially added to the solution at 2.5 times the moles of the total dianhydride content, and stirred at 60° C. for 12 hours.

After the polymerization was completed, the polymerized solution was precipitated in an excess of methanol, and then the solid content obtained by filtration was dried under vacuum at 50° C. for 6 hours or more to obtain a polyamide-imide powder. The powder was diluted and dissolved in DMAc to 20%, and 100 o ppm of fumed silica was added and dispersed to prepare a polyimide-based resin solution.

The polyimide-based resin solution was prepared and then treated in the same manner as in Example 1.

Example 4

Example 4 was performed in the same manner as in Example 3, except that the stretching was not performed and the thickness was made to be 80 μm.

Comparative Example 1

Comparative Example 1 was performed in the same manner as in Example 3, except that molar ratios of terephthaloyl chloride and isophthaloyl chloride were 20 mol and 10 mol.

Comparative Example 2

Comparative Example 2 was performed in the same manner as in Example 3 except that 30 moles of terephthaloyl chloride was used and isophthaloyl chloride was not used to manufacture a film having a thickness of 80 μm.

Physical properties of the manufactured polyamide-imide film were measured and are shown in Table 1 below.

TABLE 1

|  | Example 1 | Example 2 | Example 3 | Example 4 | Comp. Example 1 | Comp. Example 2 |
|---|---|---|---|---|---|---|
| Degree of orientation | 0.23 | 0.18 | 0.56 | 0.6 | 0.8 | 0.7 |
| Degree of curl (mm) | 1.2 | 0.9 | 2.3 | 3.2 | 5.6 | 7.3 |

The polyimide-based film according to the present invention is flexible, has no difference in a structure between the surface layer and the inside of the film to have a uniform structure, has less curl generation, and has excellent transmittance and transparency, and is therefore suitable for being applied as an optical film.

Accordingly, the polyimide-based film according to the present invention may be applied to a window cover film of a display, a foldable device, etc.

Hereinabove, although the present invention has been described by specific matters, the limited embodiments and drawings, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. A polyimide-based film having a difference ($\Delta I$) between maximum and minimum values of an intensity in a thickness direction of 0.6 arbitrary unit (AU) or less, when an aromatic ring peak of 1610 to 1630 $cm^{-1}$ was measured by Raman spectroscopy in which an excitation wavelength is 532 nm, a laser spot is 1 to 2 μm, and a thickness direction measurement interval is 1 μm, and having a degree of curl of 5 mm or less.

2. The polyimide-based film of claim 1, wherein the polyimide-based film has a light transmittance of 5% or more at 388 nm and a total light transmittance of 87% or more at 400 to 700 nm as measured according to ASTM D1746, a haze of 2.0% or less, and a yellow index of 5.0 or less, and a b* value of 2.0 or less.

3. The polyimide-based film of claim 1, wherein the polyimide-based film has a modulus of 3 GPa or more and an elongation at break of 8% or more as measured according to ASTM D882.

4. The polyimide-based film of claim 1, wherein the polyimide-based film has a thickness of 10 to 500 μm.

5. The polyimide-based film of claim 1, wherein the $\Delta I$ is 0.4 or less.

6. The polyimide-based film of claim 1, wherein the polyimide-based film is formed of a polyimide-based resin having a polyamide-imide structure.

7. The polyimide-based film of claim 6, wherein the polyimide-based resin contains a unit derived from a fluorine-based aromatic diamine.

8. The polyimide-based film of claim 6, wherein the polyimide-based resin contains a unit derived from a cycloaliphatic dianhydride.

9. The polyimide-based film of claim 6, wherein the polyimide-based resin contains a unit derived from a fluorine-based aromatic diamine, a unit derived from an aromatic dianhydride, and a unit derived from an aromatic diacid dichloride.

10. The polyimide-based film of claim 9, further comprising a unit derived from a cycloaliphatic dianhydride.

11. A window cover film comprising:
the polyimide-based film of claim 1; and
a coating layer formed on one surface of the polyimide-based film.

12. The window cover film of claim 11, wherein the coating layer is any one or more selected from the group consisting of an antistatic layer, an anti-fingerprint layer, an anti-fouling layer, an anti-scratch layer, a low refractive layer, an anti-reflection layer, and an impact absorbing layer.

13. A flexible display panel comprising the polyimide-based film of claim 1.

\* \* \* \* \*